United States Patent
Metcalf et al.

(10) Patent No.: US 7,257,089 B2
(45) Date of Patent: Aug. 14, 2007

(54) SYSTEM FOR NETWORKING ATTENDANT AND MESSAGING SPEECH SYSTEMS

(75) Inventors: Michael Metcalf, Trabuco Canyon, CA (US); Peter Dingus, Mission Viejo, CA (US)

(73) Assignee: Applied Voice and Speech Technologies, Inc., Foothill Ranch, CA (US)

( * ) Notice: Subject to any disclaimer, the term of this patent is extended or adjusted under 35 U.S.C. 154(b) by 1047 days.

(21) Appl. No.: 10/231,941

(22) Filed: Aug. 30, 2002

(65) Prior Publication Data

US 2004/0042443 A1  Mar. 4, 2004

(51) Int. Cl.
- H04L 12/16 (2006.01)
- H04L 12/66 (2006.01)
- H04M 3/42 (2006.01)
- H04M 7/00 (2006.01)
- G10L 15/00 (2006.01)

(52) U.S. Cl. .............. 370/259; 370/356; 370/401; 379/201.01; 379/220.01; 704/270

(58) Field of Classification Search ........... 370/259, 370/356, 401; 379/201.01, 220.01; 704/270
See application file for complete search history.

(56) References Cited

U.S. PATENT DOCUMENTS

| | | | | |
|---|---|---|---|---|
| 6,098,043 | A * | 8/2000 | Forest et al. | 704/270 |
| 6,445,694 | B1 * | 9/2002 | Swartz | 370/352 |
| 6,535,521 | B1 * | 3/2003 | Barghouti et al. | 370/462 |
| 6,556,563 | B1 * | 4/2003 | Yarlagadda | 370/352 |
| 6,865,266 | B1 * | 3/2005 | Pershan | 379/221.13 |
| 6,922,411 | B1 * | 7/2005 | Taylor | 370/401 |
| 2002/0191635 | A1 * | 12/2002 | Chow et al. | 370/463 |
| 2003/0227871 | A1 * | 12/2003 | Hsu et al. | 370/230 |
| 2004/0008632 | A1 * | 1/2004 | Hsu et al. | 370/252 |

* cited by examiner

Primary Examiner—Alpus H. Hsu
(74) Attorney, Agent, or Firm—Joseph E. Levi (57) ABSTRACT

A method and network that employs N attendant, messaging and content-based speech systems networked together to transfer call sessions via a VoIP bi-directional link. To enhance network performance, each of the N systems of the network includes an extension database having N city or system directories identifying the extensions and the names associated with such extensions. The caller is given a prompt to provide the network a city where the target resides. Thereafter, the network determines the target's extension by directly accessing the appropriate directory.

22 Claims, 4 Drawing Sheets

SYSTEM FOR NETWORKING ATTENDANT AND MESSAGING SPEECH SYSTEMS

FIELD OF THE INVENTION

The present invention related to networked telephony speech systems and methods and, more particularly, to a system for networking attendant and messaging speech system that has the ability to seamlessly and modularly network a system of self-synchronizing attendant, messaging and content-based speech systems to facilitate a distributed office.

BACKGROUND OF THE INVENTION

Systems that network voicemail systems to facilitate a distributed office, include, without limitation, networks by Cisco®, Advanced Voice®, etc. Networks like that of Cisco® have included voice over Internet protocol (VoIP) communications. However, prior networked voicemail systems do not transfer the session of the caller from one system to another system of the network using speech VoIP to transfer the session. Instead, prior systems transfer messages or calls but not the entire session. Accordingly, since the entire session is not transferred, the caller typically cannot speak to several people at the distant location, leave messages for several people at the location, broadcast messages at the location, etc. all as though they were at the other location.

In view of the above, there is a continuing need for a network of attendant, messaging and content-based speech systems to facilitate a distributed office wherein each system can transfer a session of a caller to another system at a distant location so that the caller can speak to several people at the distant location, leave messages for several people at the location, broadcast messages at the location, etc. all as though they were at the other location.

Additionally, there is a continuing need for a network of self-synchronizing attendant, messaging and content-based speech systems that automatically updates other systems in the network with extension database additions, deletions or other changes.

As will be seen more fully below, the present invention is substantially different in structure, methodology and approach from that of the prior e-trading systems and methods.

SUMMARY OF THE INVENTION

The present invention contemplates a method and network of attendant, messaging and content-based speech systems that establishes a voice over Internet protocol (VoIP) bi-directional link between an originating system receiving a call from a caller and a destination system, when the destination system serves a target. The originating system transmits a wink string over the VoIP bi-directional link to the destination system to transfer a call session between the caller connected to the originating system and the destination system using the VoIP bi-directional link.

The present invention further contemplates a network that can be seamlessly and modularly increased or decreased by using self-synchronizing attendant, messaging and content-based speech systems.

The above and other objects of the present invention will become apparent from the drawings, the description given herein and the appended claims.

DETAILED DESCRIPTION OF THE INVENTION

Figure 1:
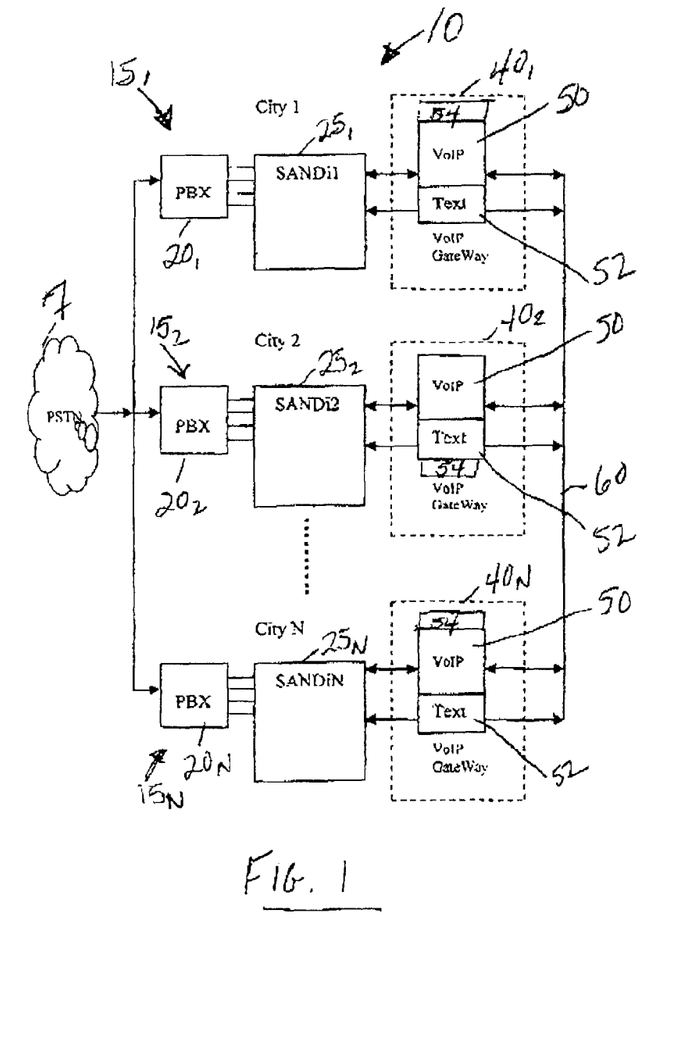
FIG. 1 illustrates the general block diagram of the VoIP SANDi distributed network in accordance with the present invention.
Figure 3:
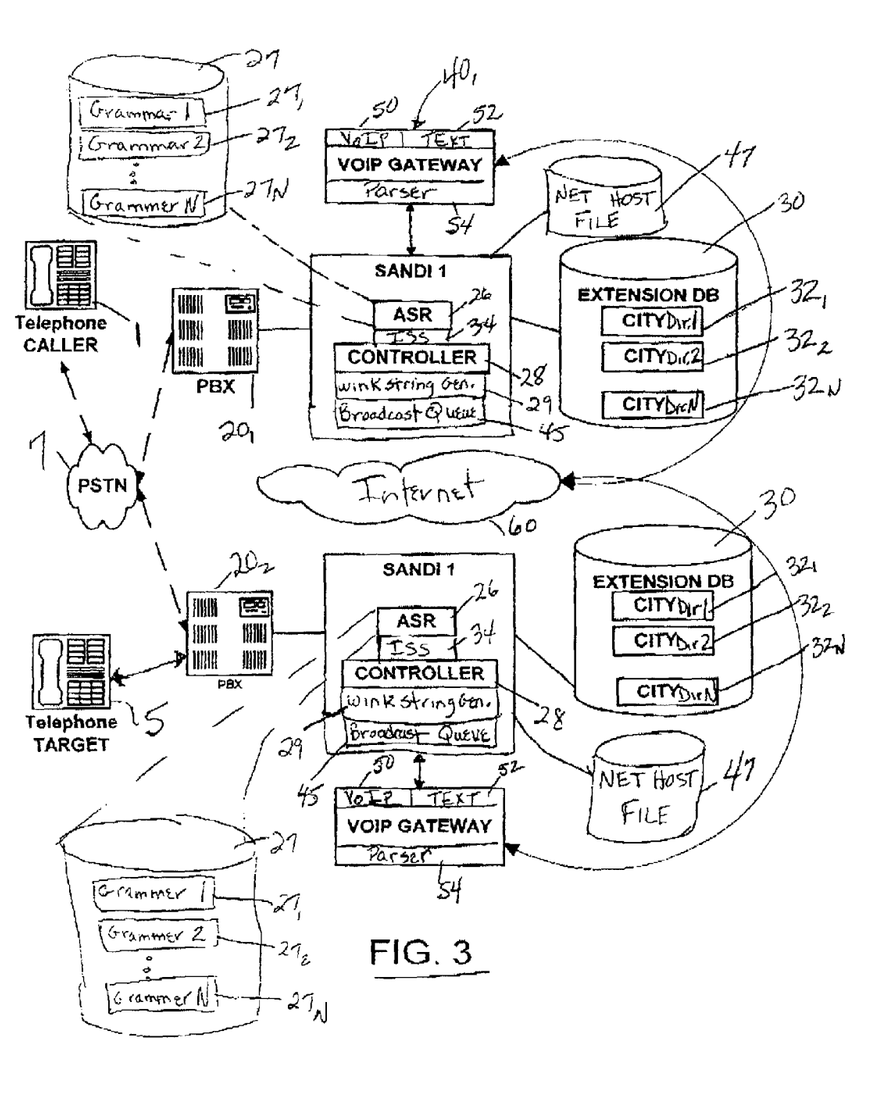
FIG. 3 illustrates a general block diagram of two SANDi systems of a call in accordance with the present invention.

Referring now to the drawing and in particular FIGS. 1 and 3, the VoIP SANDI distributed network 10 includes a plurality of attendant, messaging and content speech systems (AMCS) $15_1$, $15_2$ ... $15_N$ that are seamlessly networked to facilitate a distributed office or the like. Each AMCS $15_1$, $15_2$ ... $15_N$ resides at different locations, such as, without limitation, in different cities City 1, City 2, ... City N, wherein the cities may be located in different states. Examples of distributed offices include Real Estate Companies, Financial Companies, etc., where such companies have more than one office in more than one location or city.

Each AMCS $15_1$, $15_2$ ... $15_N$ includes a private branch exchange $20_1$, $20_2$ ... $20_N$, respectively, that interfaces with the public switched telephone network (PSTN) 7 through which off-network calls are routed, whether incoming or outgoing. The private branch exchanges (PBXs) $20_1$, $20_2$ ... $20_N$ may be connected to one or more Regional Bell Operating Companies (RBOCs) of the PSTN 7 depending on the locations of the AMCS $15_1$, $15_2$ ... $15_N$.

The AMCS $15_1$, $15_2$ ... $15_N$ further include Sound Advantage Natural Dialog Interfaces (SANDIs) $25_1$, $25_2$ ... $25_N$, respectively, that are coupled to PBXs $20_1$, $20_2$ ... $20_N$, respectively. The SANDIs $25_1$, $25_2$ ... $25_N$ are networked together via a plurality voice-over Internet protocol (VoIP) gateways $40_1$, $40_2$ ... $40_N$ connected to the World-Wide-Web or Internet 60. Since each SANDI $25_1$, $25_2$ ... $25_N$ is essentially the same, only one such SANDI will be described in detail.

SANDI $25_1$ includes an automatic voice/speck recognition unit (ASR) 26 which functions in cooperation with an interactive speech synthesizer unit (ISS) 34 to carryout interactive automated attendant functionality. The operation of the ASR 26 and ISS 34 will be described in more detail below in relation to FIG. 2. The SANDI $25_1$ further includes a processing unit or controller 28 and an employee extension database 30.

Typically, for networks that are distributed, the size of the active grammar file 27 in the ASR 26 to accommodate N cities would be very large. This is due to the fact that each of the N SANDIs $25_1$, $25_2$ ... $25_N$ would need to accommodate N times the number of names as that of a single SANDI. Therefore, the voice recognition processing time would be slower even if a fast processing unit or controller 28 was utilized. In an effort to reduce the voice-recognition processing time so that the caller 1 does not experience long delays, the employee extension database 30 of the present invention is divided into N city directory files $32_1$, $32_2$ ... $32_N$.

For example, if the network 10 contained five (5) locations, each location would support or accommodate up to 200 extensions. Hence, if there are three (3) unique words per extension on average, the active grammar file 27 in each SANDI could have more than 600 words. Accordingly, each SANDI would need to accommodate 3000 words in its respective active grammar file.

In order to maintain performance for such a network 10, each processing unit or controller 28 would, preferably, be a fast dual processor machine (i.e. a dual 800 MHz PIII). As can be appreciated, although the network 10 can maintain the desired performance with a fast dual processor machine, the network 10 would still have problems adding extensions or new sites to the network 10. In other words, such a solution does not allow the network 10 to be easily modular so that other sites can be seamlessly added. Accordingly, the network 10 employs an employee extension database 30 that is divided into N city directory files $32_1, 32_2 \ldots 32_N$ and the active grammar file is divided into N city active grammar files $27_1, 27_2 \ldots 27_N$. Therefore, the network 10 of the present invention can be seamlessly and modularly increased or decreased or changed while maintaining performance and functionality. For example, when adding a new site, each SANDI $25_1, 25_2 \ldots 25_N$ needs only to be updated with the city directory file of such city and the corresponding active grammar file. Thus, the network 10 can add additional sites in a modularly fashion. Accordingly, the network 10 can be expanded with almost unlimited number of sites while maintaining performance with a cheaper machine. In operation, the network 10 indexes the names of the Target 5 by City, thus once the City is determined, the SANDI loads that cities active grammar file from files $27_1, 27_2 \ldots 27_N$ into its ASR 26.

It should be noted that the active grammar file 27 of the ASR 26 has a sufficient grammar size to be able to recognize any name on the network 10 without recourse to indexing names by site (city or location). Otherwise, the names would be indexed by city, or any other appropriate index.

For example, depending on the organization under consideration, department or division might be appropriate indices given an organization with distributed or telecommuting members. Indices appear as city, department, division, or whatever index is appropriate in the employee extension database 30. An employee, subscriber or member (hereinafter referred to as an "employee") is someone serving the VoIP SANDI distributed network 10. The index is a piece of information correlated to a particular employee in the database (i.e. a database column pertaining to a row which is associated with the particular employee). When the index is determined during the course of a call (i.e. the caller has asked for city "N") the SANDI dynamically develops the appropriate grammar file for that city from searching the database for the appropriate index. Once the grammar file is downloaded into the engine, the caller can ask for any employee in that particular city. All local employee databases are synchronized whenever a new employee is added via a network broadcast queue. Returning again to the operation, once, the session of a call is transferred between sites or any two SANDIs by establishing a bi-directional link between the two SANDIs in network 10. When the session is transferred, the caller 1 also has access to the interactive voice response menu and functionality of the destination SANDI. The transferred session to the destination SANDI allows the caller to speak to several people at the distant location, leave messages for several people at the location, broadcast messages at the location and other wise have access to all the other features and services of the destination SANDI as though they were local to the destination SANDI.

In the preferred embodiment, the bi-directional link is a VoIP connection via a VoIP interface 50 between any two VoIP gateways $40_1, 40_2 \ldots 40_N$. The VoIP interface 50 can handle, in general, binary data and ASCII data or text 52. If the originating SANDI $25_1$ sends binary data over the VoIP bi-directional link, the destination SANDI 252 routes the binary data to its ASR 26. On the other hand, if SANDI $25_1$ sends ASCII, which is text, then the ASCII stream is routed to the controller 28 of SANDI $25_2$. The ASCII stream is used to query the employee extension database 30 to lookup the extension of the Target 5.

In a particular embodiment, the ASCII and binary data can be discriminated by two byte labels sent as the first two bytes of the currently received data buffer. Labels indicating an ASCII buffer would correspond to a subscriber name and wink string. The wink string, described below, indicates the origin of the call, in this case the VoIP port, originating city code and the destination extension (local extension). The name could be used as a database lookup for their (the employee's) corresponding local information. Since the caller at the originating end of the VoIP connection has already asked for the employee and the local ASR has already performed the voice to text translation, the name is sent as the VoIP connection is established. The original caller hears the correct extension at the target city ringing once the connection is established. Correspondingly, the voice connection is maintained with data buffers containing digitized voice (i.e. in one embodiment 4 kilobyte digitized PCM voice data buffers originating from the VoIP codec).

When transferring the session, the originating SANDI transmits inter-city wink codes or "wink strings" to the destination SANDI to enable transparent operation between sites in the network 10. For the purposes of this application, the term "wink string" is defined as a code or string identifying how to handle a call when it is received on a regular phone line. In the phone line case, the "wink string" appears as a DTMF string created when the telephone number of the Target 5 is entered via a touch-tone telephone. Therefore, SANDI $25_1$ further includes a "wink string" generator 29 that produces the ASCII translated DTMF "wink string."

The network 10 is adapted to interpret "wink strings" whether the call is a local call through the PSTN 7 or a VoIP call session transfer giving a uniform way of interpreting calls whether they originate from the phone side or the network side to connect the networked SANDIs $25_2 \ldots 25_N$. Therefore, it is essential that the networked SANDIs $25_2 \ldots 25_N$ are self-synchronizing such that the extension database 30 of each networked SANDI $25_2 \ldots 25_N$ is automatically synchronized with an employee, city and extension entry, as will be described in more detail below.

Each PBX $20_1, 20_2 \ldots 20_N$ has numerous voicemail ports (lines) where "local" or on-site calls from the PSTN 7 are received. Calls received on voicemail ports are transmitted to a SANDI via "wink strings." When a VoIP bi-directional link is made between any two SANDIs such as SANDI $25_1$ and SANDI $25_2$, one of lines of SANDI $25_2$ receives the VoIP connection. SANDI $25_2$ then sets this line as "Busy"—otherwise if a PSTN call is received by SANDI $25_2$, it may conflict with the VoIP connection on that line.

Referring now the VoIP gateways $40_1, 40_2 \ldots 40_N$ only one such gateway will be described in detail. The VoIP Gateway $40_1$ operates in two modes. First, the VoIP gateway 40 can pass ASCII text 52 or second, it can pass binary data under program control via the VoIP interface 50.

Additionally, when transferring a session, the astern parses the "Wink String" sent in ASCII by the originating system (that was originally called by the caller) in order to determine how to process the call. Both VoIP and PSTN calls are symmetrically processed in this way. The Generic Parser is part of the Speech System (SANDI in this embodiment) front-end processor as described in application Ser. No. 09/796,946 entitled "VOICE-ACTIVATED INTERACTIVE MULTIMDIA INFORMATION PROCESSING SYSTEM" that was filed on Mar. 1, 2001, now U.S. Pat. No. 7,177,402, the contents of which are incorporated by reference herein.

Additionally, when transferring a session, the VoIP Gateway $40_1$ further includes a generic parser 54 used to interpret a "wink string" designation in accordance with the present invention.

An exemplary "wink string" of the present invention has the following string coding:

780#1#<EXT>#.

This string coding indicates, when received, by a destination SANDI on the network 10 that the present call was a SANDI call or, more specifically, a VoIP call (780), that originated from location number (1), for extension <EXT> at the destination site (present location). In other words, the first three (3) digits would designate a transferring (session) call or a VoIP call. The fourth digit would designate the originating site or City number. The last three digits would be used to identify the extension of the Target 5.

As should be noted, the number of digits in the extension is completely dependent on the PBX. Some PBXs admit only two digit extensions, some admit up to 5 digits. The number of digits in the local extension is determined by the local system administrator and is dependent on the local PBX.

Referring now to the extension databases 30, each city directory file $32_1, 32_2 \ldots 32_N$ includes for each employee or Target 5, an identification, extension identifier or number, the name of such employee or Target 5, the corresponding telephone number, a server Internet protocol address and a server port designation, as shown in Table 1.

TABLE 1

| ID | Extension | Name | Phone Num | ServerIP | ServerPort |
|---|---|---|---|---|---|
| 36 | 12 | Michael Metcalf | 5551234 | 64.270.168. | 3235 |
| 37 | 11 | Jon Prime | 5555678 | 64.270.168. | 3235 |
| 38 | 10 | Peter Dingus | 5553579 | 64.270.168. | 3235 |

Table 1 above is an example of an extension map database table for a city directory file to accommodate a VoIP broadcast queue. The ID column is for a unique primary key or identification. The Extension column is for the PBX extension number or identifier. The Name column is for the name of the employee or other name to be recognized. The PhoneNum column is for the local telephone number. The ServerIP column is for the Internet Protocol address of the SANDI which is local to the name. The ServerPort column is for the identification of the port used for the VoIP connection.

The extension database 30 of each SANDI is synchronized via a socket based broadcast queue 45. Preferably, the network 10 synchronizes the extension databases 30 (the N city directory files $32_1, 32_2 \ldots 32_N$) and the N active grammar files $27_1, 27_2 \ldots 27_N$ with any new employee list entries and related grammar, respectively, that might have been made since the last call.

As previously described, the grammar files $27_1, 27_2 \ldots 27_N$ are developed dynamically. That is to say the basic information lies in database city indices. In order to speed up the process (dynamic compilation of a city grammar) previously compiled files could be cashed (saved to disk or database for later use) and updated when the broadcast queue receives an update to the subscriber list for that city.

In operation, whenever a respective extension table is locally administered (i.e. a name is added or deleted or correlated information is changed), the associated SANDI broadcasts the new change to all other SANDIs in the network 10. In other words, the SANDI broadcasts the new change to all IP addresses in a local Network Host File 47. Thereafter, all SANDIs on the network 10 asynchronously update their extension databases to reflect the new change. The Network Host File 47 contains a list of SANDIs on the network and their aliases, as identified below in Table 2. In the exemplary embodiment, an alias is a city or location name.

TABLE 2

| Host Name | IP Address |
|---|---|
| Orange | 64.167.87.1 |
| Cleveland | 64.167.87.2 |
| Boston | 64.167.87.3 |
| Sacramento | 64.167.87.4 |

Whenever the network 10 is changed, whether modularly increased or decreased or changed, the network administrator would update the local Network Host File 47 with the necessary SANDI additions, deletions or changes. Thus, the network 10 can be seamlessly modified so that the SANDIs are ready to receive a VOIP or PSTN "local" call.

Overview of the Call Processing Procedure with Session Transfer

Figure 2:
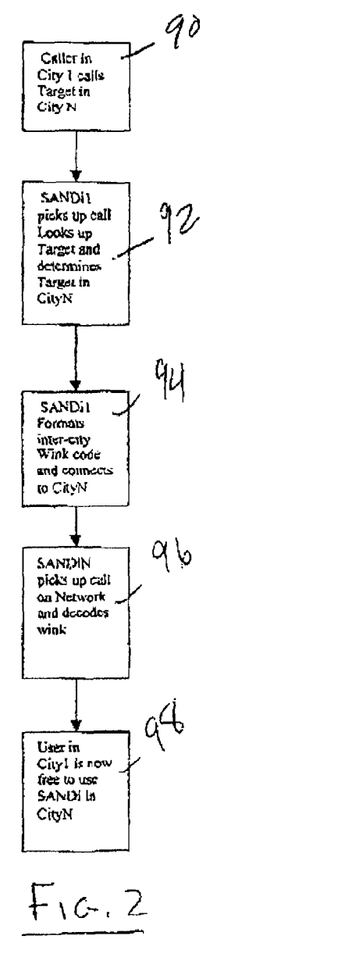
FIG. 2 illustrates the general flowchart of the network receiving a call in accordance with the present invention.

Referring now to FIGS. 2 and 3, a caller 1 places a call to the network 10 at Step 90. In the exemplary embodiment, the call is made in City 1 and received at PBX $20_1$. Step 90 is followed by Step 92 where the PBX $20_1$ receives a call from telephone caller 1 via the PSTN 7 (at Step 90), the ISS 34 of SANDI $25_1$ would automatically communicate predefine words or phrases and wait for responses by the caller to accomplish a call through the site or network 10. For example, the ISS 34 would output the phrase "after the beep say the first and last name of the person you want or ask for the city directory". Thereafter, the SANDI would wait for a valid response. In the exemplary embodiment, the user said "city directory" and the ASR 26 would interpret that "city directory" was spoken. Thereafter, the ISS 34 would respond by outputting the phrase "which city." The SANDI $25_1$ would again wait for a valid response to determine whether the Target 5 is on-site or off-site. Accordingly, Step 92 is where the SANDI $25_1$ picks up the call and determines that the Target 5 is in City N where N=2.

On-Site Call

If the caller 1 said "city 1" (the name of the city for the local SANDI $25_1$), the ISS 34 would respond by outputting the phrase "say the first and last name of the person you want". Again, the SANDI $25_1$ would wait for a response.

Once the name spoken by the caller is processed by the ASR 26, the ASR 26 identifies the employee's extension and the SANDI 25$_1$ completes the call in cooperation with PBX 20$_1$. PBX 20$_1$ functions in a conventional manner to carryout call connectivity between the caller 1 and an on-site extension. Accordingly no further explanation is needed.

Off-Site Call

Referring again to FIGS. 2 and 3, during Step 92, the originating SANDI 25$_1$ determined that the extension is off-site when the ASR 26 recognized that the caller 1 said "City 2" (the name of the city where SANDI 25$_2$ resides). Furthermore, the ISS 34 would respond by outputting the phrase "say the first and last name of the person you want". Again, the SANDI 25$_1$ would wait for a response. Thereafter, the ASR 26 recognizes the name spoken by the caller 1 to look-up the extension in the city directory file 32$_2$. Accordingly at Step 92, the SANDI determines that the extension (Target 5) is in "City 2".

Step 92 is followed by Step 94 where SANDI 25$_1$ formats an inter-city wink code or "wink string" via the "wink string" generator 29 and connects to the VoIP gateway 40$_1$. During Step 94, the SANDI 25$_1$ opens a bi-directional link with SANDI 25$_2$ so that the control of the call from caller 1 is passed from SANDI 25$_1$ to SANDI 25$_2$.

Step 94 is followed by Step 96 where SANDI 25$_2$ picks up the call on network 10 via the VoIP bi-directional link over the Internet 60 and decodes the inter-city wink code or "wink string" via generic parser 54 and to connect the call from caller 1 to the Target 5. Step 96 is followed by Step 98 where the caller 1 has access to the SANDI 25$_2$.

Figure 4:
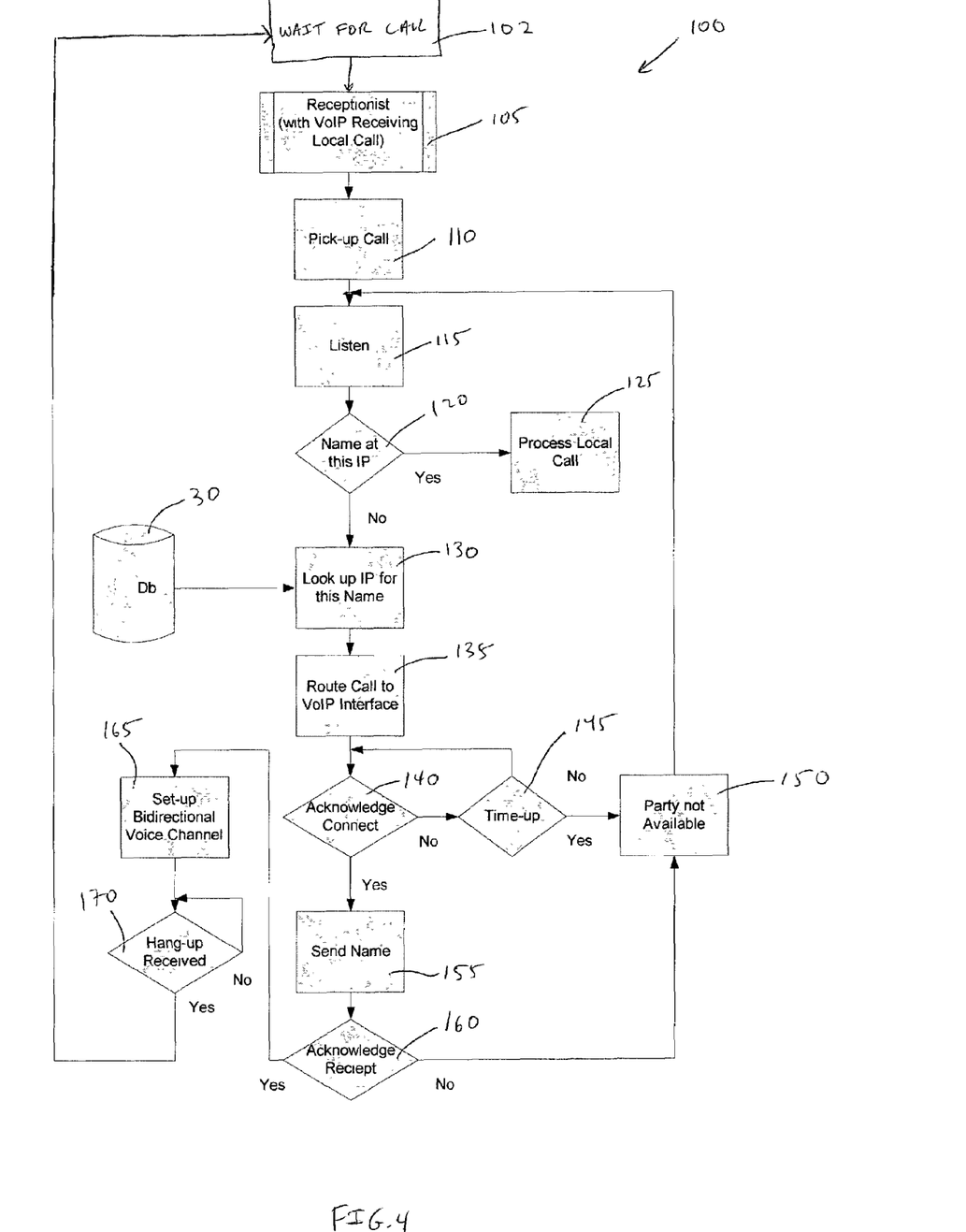
FIG. 4 illustrates the general flowchart of the SANDI receiving and processing a local call in accordance with the present invention.

Referring now to FIG. 4, a general flowchart of a local call process in accordance with the present invention is shown. The local call process 100 begins at Step 102 where the system waits for a call. Step 102 is followed by Step 105 where the receptionist (SANDI) receives a local call. Step 105 is followed by Step 110 where the call is picked up. Step 110 is followed by Step 115 where the local (originating) SANDI listens to the speech from the caller and processes such speech, as described above. As described above, the SANDI interacts with the caller to identify the Target 5. Step 115 is followed by Step 120 where a determination is made whether the name of the Target 5 is for a local (on-site) extension. If the determination is "YES" then Step 120 is followed by Step 125 where the call is processed by the local SANDI and the local PBX.

On the other hand, if the name is associated with the local site and the determination is "NO," then Step 120 is followed by Step 130 where the Internet Protocol address for the name is looked up in the extension database. Step 130 is followed by Step 135 where the SANDI routes the call to the VoIP interface of the VoIP gateway. Step 135 is followed by Step 140 where a determination is made regarding whether the VoIP interface 50 acknowledges connection. If the determination is "NO," then Step 140 is followed by Step 145 which determines whether a time-out condition is met for completing the VoIP interface connection and its acknowledgement. If the determination is "NO" at Step 145, Step 145 returns to Step 140 to determine if the acknowledgement of the connection is made. Otherwise, if the determination is "YES" at Step 145, then Step 145 is followed by Step 150 where the caller 1 is notified that the party or Target 5 is not available. Step 150 returns to Step 115 described above.

However, if the determination at Step 140 is "YES," then Step 140 is followed by Step 155 where the SANDI sends the name of the Target 5 to the off-site SANDI. Step 155 is followed by Step 160 where a determination is made whether an acknowledgment is received from the off-site SANDI. If the 20 determination is "NO" at Step 160, then Step 160 is followed by Step 150 where the caller 1 is notified that the party or Target 5 is not available.

However, if the determination is "YES" at Step 160, then Step 160 is followed by Step 165 where a bi-directional voice channel is set up between the SANDI pair (originating SANDI and destination SANDI serving Target 5). Step 165 is followed by Step 170 where a determination is made whether a hang-up is received or detected. If a hang-up is not received and the determination is "NO," then Step 170 loop back upon itself. If the determination is "YES" at Step 170, then Step 170 returns to Step 102 described in detail above, where the system waits for a call (ring).

Figure 5:
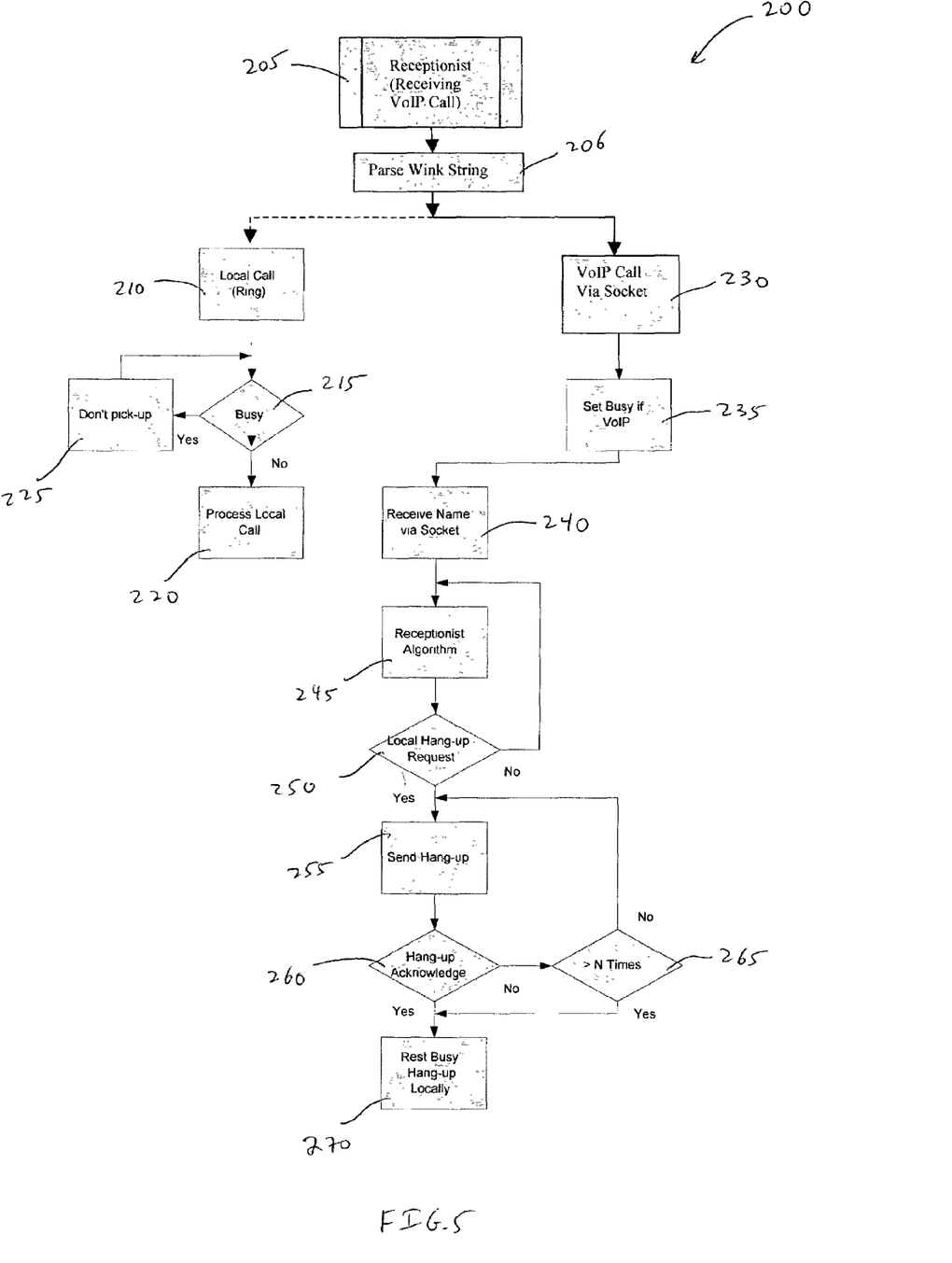
FIG. 5 illustrates the general flowchart of the SANDI operation during a VoIP call in accordance with the present invention.

Referring now to FIG. 5, a general flow chart of the SANDI operation during a VoIP call process 200 is shown. Process 200 begins at Step 205 where the destination SANDI receives a VoIP call from an originating SANDI, as described in FIG. 4. Step 205 is followed by Step 206 in which the wink string is parsed. Next, in Step 210, a local call is received or in parallel, a VoIP call is connected to a corresponding socket at Step 230.

Referring again to Step 210, Step 210 is followed by Step 215 where a determination is made whether the line is busy. If the determination is "NO," the call is processed in accordance with a local call procedure via the local PBX. Otherwise, if the line is busy and the determination is "YES," then the call is not picked up at Step 225. Step 225 returns to Step 215.

Referring again to Step 230, Step 230 is followed by Step 235 where the port line is set busy. Step 235 is followed by Step 240 where the name of Target 5 is received via the socket or bi-directional link. Step 240 is followed by Step 245. Step 245 is a receptionist algorithm.

The receptionist algorithm is the way in which SANDI handles a call once received. It entails prompting the caller for who they wish to speak to, taking that information and ringing the person at their desk or virtual extension. Offering the caller other options if the person can not be found including; locating the person, leaving a message, or trying another person. This algorithm is fully described in the previously reference application Ser. No. 09/796,946.

During the receptionist algorithm, the caller 1 has full capability of the destination SANDI's menu and functionality such as, without limitation, to speak to several people at the destination location, leave messages for several people and broadcast messages.

Step 245 is followed by Step 250 where a determination is made whether a hang-up condition is detected locally. If the determination is "NO," Step 250 loop back to Step 245. However, if the determination is "YES," then Step 250 is followed by Step 255 where the SANDI sends a hang-up (call termination) signal to the originating SANDI (Note Step 170 of FIG. 4). Step 255 is followed by Step 260 where a determination is made whether an acknowledgement of the hang-up signal is received. If the determination is "NO," Step 260 is followed by Step 265 where another determination is made whether the hang-up (call termination) signal has been re-sent. If the determination is "NO," then Step 265 loop back to Step 255 where the hang-up signal is re-sent. On the other hand, if the determination is "YES," then Step 260 is followed by Step 270 where the port line is reset and marked un-busy and the call is hung-up locally. When the originating SANDI receives the hang-up signal, the VoIP connection (bi-directional link) can be terminated.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiment may be varied without departing from the spirit of the invention, and the exclusive use of all modifications which come within the scope of the appended claims is reserved.

What is claimed is:

1. A method of transferring call sessions between a network of attendant, messaging and content-based speech systems for a call between a caller and a target, comprising the steps of:
    establishing a voice over Internet protocol (VoIP) bi-directional link between an originating system receiving the call from the caller and a destination system, the destination system serving the target, wherein the originating system is a first attendant, messaging and content-based speech system serving a first plurality of extensions at a first location, the destination system is a second attendant, messaging and content-based speech system serving a second plurality of persons at a second location, the originating system being networked with the destination system;
    transmitting a wink string over the VoIP bi-directional link;
    transferring a call session to the destination system using the VoIP bi-directional link; and
    after the step of transmitting, causing the destination system to provide services to the caller during the call in the same manner as providing the services to calls local to the destination system.

2. The method in accordance with claim 1, further comprising the steps of:
    carrying out the call session at the destination system;
    terminating the call session, and,
    terminating the VoIP bi-directional link.

3. The method in accordance with claim 2, wherein the call session includes, by the caller, speaking to a plurality of persons at the destination system.

4. The method in accordance with claim 2, wherein the call session includes at least one of, by the caller, leaving messages for several people at the destination system; sending a broadcast message at the destination system using the destination system's menus and functionality.

5. The method in accordance with claim 1, wherein the transmitting step includes the steps of;
    looking up, by the originating system, in a directory file designated for the destination system a target's extension; and,
    determining the target's extension at the destination system during the looking up step.

6. The method in accordance with claim 5, wherein the transmitting step further includes the steps of:
    creating the wink string using the target's extension identified in the determining step.

7. The method in accordance with claim 1, further comprising, prior to the establishing step, the steps of:
    receiving at the originating system the call from the caller;
    determining that the call is for the target served by the destination system;
    loading, at the originating system, into an automatic speech recognition unit an active grammar file;
    recognizing a location of the destination system; and,
    determining an extension of the target based on the recognizing step.

8. The method in accordance with claim 1, further comprising the step of:
    synchronizing each of the attendant, messaging and content-based speech systems with a list of extensions and corresponding names mapped to the extensions serviced by each respective system whenever there is an addition, deletion, or change to the list of extensions.

9. The method in accordance with claim 8, wherein the synchronizing step comprises the step of:
    broadcasting changes to each of the attendant, messaging and content-based speech systems via a socket based broadcast queue.

10. The method in accordance with claim 9, wherein the broadcasting step comprises the step of:
    accessing a network host file of internet protocol addresses of each of the attendant, messaging and content-based speech systems,
    wherein the broadcasting step broadcasts to the internet protocol addresses.

11. The method in accordance with claim 1, wherein the step of causing the destination system to provide services comprises using a voice/speech recognition unit (ASR) of the destination system and interactive speech synthesizer unit (ISS) of the destination system.

12. A network of attendant, messaging and content-based speech systems, said network of systems including an originating system configured to receive a call from a caller and a destination system that includes a target of said call, comprising:
    a plurality of gateways, each of said systems including at least one gateway of said plurality of gateways, wherein a first gateway of said plurality of gateway is associated with said originating system, the first gateway is configured to establish a voice over Internet protocol (VoIP) bi-directional link with a second gateway of said plurality of gateways, the second gateway is associated with said destination system, the VoIP bi-directional link is configured for transmitting a wink string and for transferring a call session to the destination system;
    wherein the destination system is configured to provide services to the call in the same manner as providing the service to calls local to the destination system.

13. The network in accordance with claim 12, wherein the call session is initiated at the destination system in response to the call and wherein when the call is terminated, the call session and the VoIP bi-directional link are terminated.

14. The network in accordance with claim 13, wherein the call session includes, by the caller, speaking to at least one person at the destination system.

15. The network in accordance with claim 13, wherein the call session includes at least one of, by the caller leaving messages for several people at the destination system; sending a broadcast message at the destination system using the destination system's menus and functionality.

16. The network in accordance with claim 12, wherein the originating system includes a directory file for storing directory listings the directory listing comprising an extension for each target in the network of systems and wherein when the originating system receives the call from the caller, said originating system determines whether the target is served by the originating system or the destination system based on the extensions included in the directory listings.

17. The network in accordance with claim 16, wherein the originating system forms the wink string using the target's extension.

18. The network in accordance with claim 16, wherein each of said directory listings are synchronized for updating each of said directory listings with additions, deletions or changes to any of said respective directory listings.

19. The network in accordance with claim 18, wherein said synchronization is performed via a socket based broadcast queue wherein the updates are broadcast to internet protocol addresses of the systems.

20. The network in accordance with claim 12, wherein each of said network systems includes an ASR and an active grammar file for processing speech by the caller.

21. The network in accordance with claim 12, wherein:
call session transfers are seamless; and,
the network of attendant, messaging and content-based speech systems is adapted to be modularly increased with addition of one or more new attendant, messaging and content-based speech systems or decreased by deletion of existing one or more attendant, messaging and content-based systems while maintaining network performance.

22. The network in accordance with claim 12, wherein the originating system comprises a first private branch exchange, and the destination system comprises a second private branch exchange.

* * * * *

UNITED STATES PATENT AND TRADEMARK OFFICE
CERTIFICATE OF CORRECTION

PATENT NO. : 7,257,089 B2  Page 1 of 1
APPLICATION NO. : 10/231941
DATED : August 14, 2007
INVENTOR(S) : Metcalf et al.

It is certified that error appears in the above-identified patent and that said Letters Patent is hereby corrected as shown below:

In column 9 line 30, delete "transmitting" and insert therefor --transferring--.

In column 9 line 37, delete the comma after "session" and replace with --;--.

In column 9 line 48, delete the semi-colon and replace with --:--.

In column 10 line 32, delete "gateway" (second occurrence) and insert therefor --gateways--.

In column 10 line 42, delete "service" and insert therefor --services--.

In column 10 line 59, delete "listings the directory listing" and insert therefor --listings, the directory listings--.

Signed and Sealed this

First Day of January, 2008

JON W. DUDAS
*Director of the United States Patent and Trademark Office*